United States Patent Office 3,035,174
Patented May 15, 1962

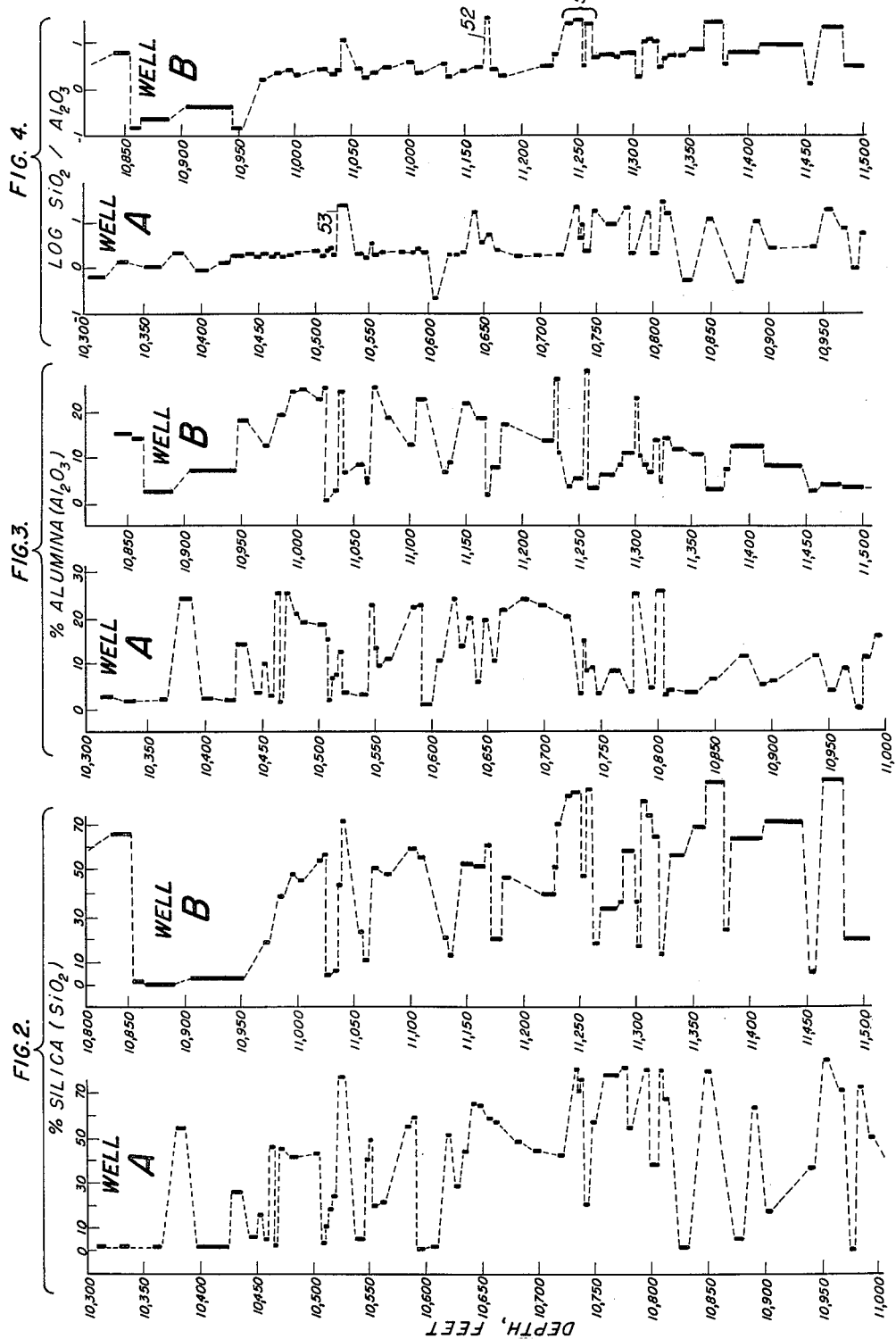

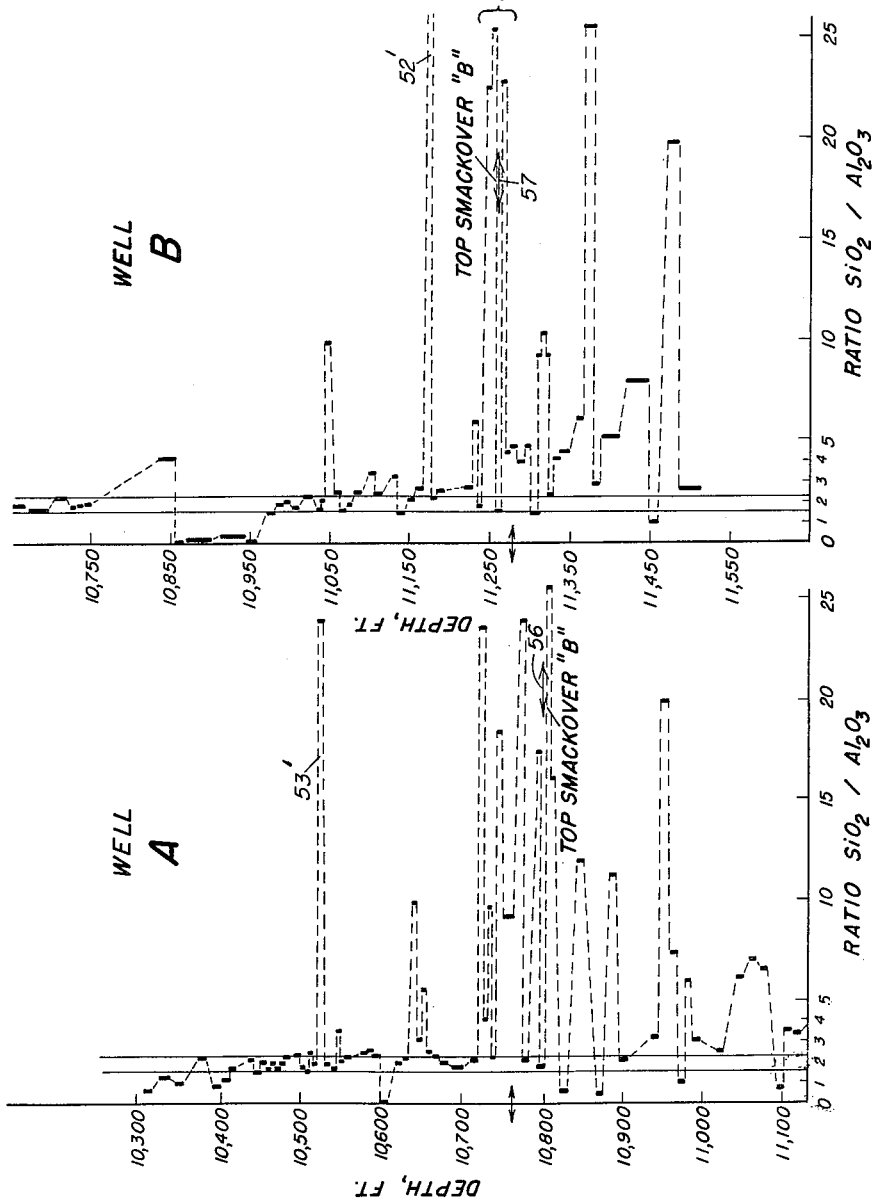

3,035,174
SILICA-ALUMINA RADIOACTIVE LOGGING
Stanley E. Turner, Tarpon Springs, Fla., and Richard L. Caldwell, Dallas, Tex., assignors, by mesne assignments, to Socony Mobil Oil Company, Inc., New York, N.Y., a corporation of New York
Filed July 28, 1958, Ser. No. 751,577
2 Claims. (Cl. 250—83.3)

This invention relates to radioactivation well logging and more particularly to a determination of the structural character of earth formations through measurements of delayed gamma radiation from aluminum 28 resulting from bombardment of silicon with high energy neutrons and delayed gamma radiation from sodium 24 resulting from bombardment of aluminum with high energy neutrons.

This application is a continuation-in-part of application Serial No. 516,566, filed June 20, 1955, now abandoned.

This invention is based upon the discovery of significant relationships between the structure of formations penetrated by a borehole and the intensity and time duration of radiation following cessation of neutron bombardment of silicon and aluminum in the formations. The invention is based further upon the discovery that measurements, at characteristic energy levels or at selected time intervals following cessation of bombardment, of the delayed gamma radiation may be taken as an indication of the concentration of silicon and of aluminum thereby to identify the formations. Such measurements also indicate the relative tenacity with which such formations may hold entrapped hydrocarbons.

In accordance with the present invention there is produced a log of the relative amounts of silicon in formations penetrated by a borehole as a function of depth. Further in accordance with the present invention there is produced a log of the relative amounts of aluminum in the formations penetrated by a borehole. An abundance of silicon will indicate a sandy stratum which may possibly be porous as to form a fluid reservoir. A high concentration of aluminum in a siliceous zone will indicate that the sand is dirty with interstices filled with cementaceous material such as clay matter. The combination of the two measurements will indicate the tenacity with which a given stratum may adhere to hydrocarbons.

In accordance with the present invention there is provided a system for identifying the character of the earth formations penetrated by a borehole which includes means for bombarding formations along the borehole with neutrons of predetermined minimum energy to induce radioactivity by disintegration of elements contained in the formations and means for selectively measuring the intensity of delayed gamma radiation from aluminum 28 and from sodium 24 following cessation of bombardment. Measurements may be made at a time within about one-half life of the newly formed nuclei. Preferably measurements are to be made following cessation of bombardment at a selected time wherein the measurements are restricted to energy bands at about 1.78 m.e.v. and either 1.38 m.e.v. or 2.78 m.e.v. to characterize the relative amounts in the formation of silicon and aluminum, respectively.

For a more complete understanding of the present invention and for further objects and advantages thereof, reference may now be had to the following description taken in conjunction with the accompanying drawings in which:

FIG. 2 illustrates variations in silica for sections of each of two wells;

FIG. 3 illustrates variations in aluminum for sections of each of two wells;

FIG. 4 illustrates variations in the ratio of silica to aluminum for sections of each of two wells; and FIG. 5 and FIG. 6 are enlargements of portions of FIG. 4.

The present method of neutron well logging depends upon the production of radioactive isotopes by fast neutron disintegration of nuclei of aluminum and silicon, resulting in the emission of one or more delayed gamma rays. In the production of conventional neutron logs, neutron capture and scattering give rise to instantaneous radiations of several different types including protons, alpha particles, neutrons and gamma rays. In one form of conventional neutron logging prompt gamma rays resulting from neutron interactions are measured. The product nuclei from these interactions may be radioactive and emit delayed gamma radiation whose energy and decay rate are characteristic of the isotope produced. The present invention relates to the measurement of delayed gamma rays at a time and at an energy level as to characterize relative concentrations of two significant constituents of petroleum reservoir formations.

Bombardment of silicon with fast neutrons results in the formation of aluminum 28 which decays with a half-life of 2.4 minutes with the gamma radiation predominantly having energy of about 1.78 m.e.v. Fast neutrons thus employed must have energy equal to or exceeding 2.7 m.e.v. which is the minimum or threshold disintegration energy, i.e., the energy for the reaction $Si^{28}(n, p)Al^{28}$. Preferably the neutrons should have energy in excess of 5.4 m.e.v. At such energy the probability of the above reaction is sufficient as to render the method herein described more readily usable.

Fast neutron bombardment of aluminum produces several isotopes including sodium 24 having a half-life of about 15 hours and strong gamma radiations of about equal intensities at about 1.38 m.e.v. and 2.76 m.e.v. Fast neutrons employed for this reaction, $Al^{27}(n, p)Na^{24}$, must have energies equal to or exceeding 2.4 m.e.v. although it will be found preferable to employ neutrons of energy well above this threshold value as, for example, of the order of 9.5 m.e.v. A source of neutrons having energy of 9.5 m.e.v. or greater will thus be found to be preferable in that it will produce substantial quantities of the isotopes from both reactions $Si^{28}(n, p)Al^{28}$ and $Al^{27}(n, p)Na^{24}$. It will readily be seen that a source of 14 m.e.v. neutrons, employing a deuterium-tritium reaction, may be used to advantage in that such source is known to provide a high flux of very high energy neutrons. In accordance with the present invention, the radiations from the two isotopes $Al^{28}$ and $Na^{24}$ are logged as a function of borehole depth thereby to provide an index to the relative proportions of silicon and aluminum.

Figure 1:
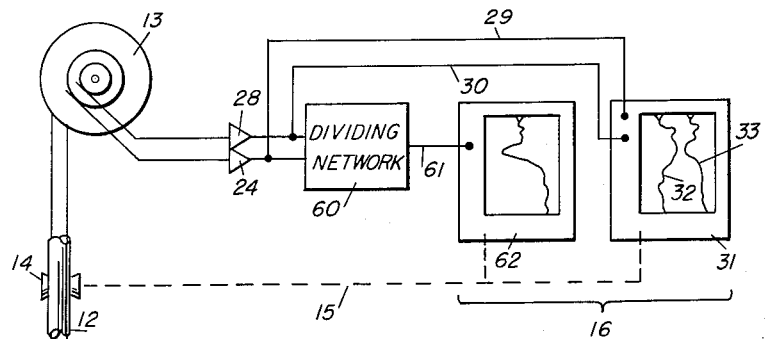
FIG. 1 illustrates a neutron-gamma ray logging system of the present invention.
Figure 1:
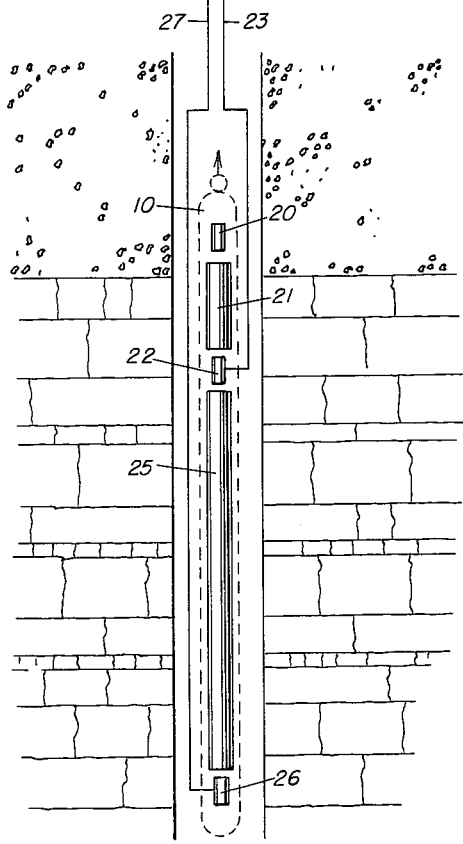

Referring now to FIG. 1, there is illustrated a well logging system including an exploring unit 10 whose outline is shown dotted. Unit 10 may conveniently be supported for movement along a well bore 11 by a cable 12 driven by a power reel 13. A measuring element 14, connected by coupling 15 to a recording system 16, is provided to drive recording mediums in recorder system 16 such that the lengths of the recording mediums are proportional to the depth to which the unit 10 is lowered.

The exploring unit 10 includes a source 20, preferably a gamma free source of fast neutrons. A shield 21 is positioned below source 20 and intermediate source 20 and a detector 22. Detector 22 is connected by way of conductor 23 in cable 12 to the power reel 13 and thence to an amplifier 24. A second shield 25 of length substantially greater than shield 21 is positioned below detector 22 and above a second detector 26. Detector 26 is connected by way of conductor 27 to reel 13 and thence to an amplifier 28. Shields 21 and 25 prevent radiation from traveling directly from source 20 to detectors 22 and 26, thus requiring that all radiation impinging such detectors come from points laterally positioned relative to the borehole and principally from the adjacent earth formations. The signals from amplifiers 24 and 28 may be transmitted by way of channels 29 and 30, respectively, to a recorder 31 which is provided with two recording elements to produce simultaneously two traces 32 and 33 representative of the radiation detected by detectors 22 and 26, respectively.

As well understood by those skilled in the art, a conventional neutron log is produced by utilizing a source such as the source 20 and a detector such as detector 22 which is placed closely adjacent the source 20. Neutrons irradiating the formations produce gamma radiation through nuclear interactions in the formations, and the gamma radiation is recorded as a function of depth. A log thus produced is known as a neutron-gamma log and indicates the total number of prompt gamma rays impinging the detector over a given measuring interval. Such a log is generally relied upon as being an indication of the relative amounts of hydrogen at various depths in the formations.

A high hydrogen content in the formations will indicate the presence of fluids. Of great value would be the determination of the character of the physical structure in which the fluids are entrapped. Of particular importance is whether or not the formation is permeable, indicating the degree of tenacity of the formations for petroleum fluids. Any such information would be useful as a guide in well reconnaissance and completion procedures.

In contrast with such well known logging procedures and in accordance with the present invention, there is provided a log of the silicon content of the formations. It has been found that neutron bombardment of sandy formations produces disintegration of silicon to produce the isotope aluminum 28 which is radioactive, producing gamma radiation at about 1.78 m.e.v. and having a half-life of 2.4 minutes.

Further in accordance with the invention, there is provided a log of the aluminum content of the formations. More particularly, neutron bombardment of sandy formations whose interstices are filled with such filler material as clay, produces disintegration of the aluminum therein forming the radioisotope sodium 24 having gamma radiation at 1.38 m.e.v. and at 2.76 m.e.v. having a half-life of about 15 hours.

Logging operations, in accordance with the present invention, will be such that measurements are made at a time at which radiations from other borehole materials will be small. More particularly, carbon having a half-life of about 27 milliseconds and oxygen with a half-life of about 7.3 seconds will not substantially affect a record at about the half-life of aluminum 28 (2.4 minutes). It has been found that measurements as soon as one minute after the end of bombardment are essentially free of carbon and oxygen contributions and dependent primarily on silicon concentration. Therefore, measurements made at any time between about 1 minute and 2.4 minutes after cessation of neutron bombardment and at energy levels of 1.38 or 2.76 m.e.v. and 1.78 m.e.v. may be obtained to produce logs of silicon and aluminum content. In carrying out such measurements it will be found that the intensity of radiation from silicon at about one minute after end of bombardment is about one hundred times the intensity of the radiation from aluminum so that measurement of the aluminum content of formations may best be made somewhat beyond the half-life of aluminum 28 isotope produced from silicon. Thus an alternative method of carrying out the invention would include the steps of: (1) bombarding the formations with fast neutrons, (2) measuring gamma radiation intensity following cessation of bombardment by about one minute as an indication of silicon content, (3) measuring the total gamma intensity following cessation of bombardment by a period of three to four hours as an indication of the aluminum content.

In carrying out the invention in the mode illustrated in FIG. 1, the borehole unit 10 is lowered to the bottom of a hole. As the unit is withdrawn, the two detectors 22 and 26 move along the borehole in a trailing relation with reference to the source 20. The detector 22 is positioned relatively close to the source 20 and detector 26 is spaced a considerable distance therefrom. The unit 10 is then moved along the borehole at a suitable speed, for example about 30 feet per minute. Selectivity as to the radiation to be detected will be enhanced by incorporating in amplifiers 24 and 28 suitable energy level discrimination. More particularly, amplifiers 24 and 28 preferably will be designed to pass signals to channels 29 and 30 only in given energy bands with the bands selected to correspond with the radiations from aluminum and sodium, respectively. Thus the two traces 32 and 33 may be made to correspond with the radiation from silicon and aluminum content of the earth formations.

A logging system of another form may include a single source and detector spaced, for example, about 20 feet apart. The unit may then be moved along the borehole at a rate of about 20 feet per minute to log silicon with the detector trailing the source of radiation. About three or four hours thereafter a detector may be moved along the borehole to log the aluminum content of the formations. Separate logs may thus be produced which, when taken together, indicate the character of the formation penetrated with particular reference to the tenacity for entrapped petroleum. The logs may be useful in and of themselves for correlation with similar logs taken from different wells over a given area.

It has been found that more definitive data is produced by observing the ratio of the two logs and more particularly the ratio of silicon to aluminum in the formations. Several logs have been illustrated in FIGS. 2, 3 and 4 to illustrate the foregoing. In FIG. 2 the percent of silicon dioxide has been plotted as a function of depth for two wells. Well A is identified as A. Wasson No. 1 (wildcat), Claiborne Parish, Louisiana. Well B is identified as Drew F. Hightower No. 1, Summerfield Field, Claiborne Parish, Louisiana. These logs were produced by collecting earth cores or samples from the different depths indicated by the heavy line segments of the graphs during drilling operations. The samples were then subjected to neutron irradiation. Subsequently the delayed gamma radiation from the samples was detected with discrimination being employed to limit the detection to the radiation from the silicon therein.

It is to be noted that the depth scales for well A have been displaced relative to well B by about 500 feet. In FIG. 2 the logs thus aligned show points where correlation is extremely ambiguous. The high contrasts in the content of silica in the formations indicate selectivity as to the logging method.

In FIG. 3 the percent of aluminum oxide has been plotted with the data having been obtained from the same general techniques as data in FIG. 2 with the exception that radiation detection was limited to that from the isotope produced by neutron bombardment of aluminum. Here again wide contrasts in radiation appear with points of anti-correlation for the depths selected.

In FIG. 4 the log of the ratio of silicon dioxide to aluminum oxide has been plotted for each of wells A and B. The ratios were computed from the data in FIGS. 2 and 3. The ambiguous points in FIGS. 2 and 3 are largely eliminated with excellent correlations now being apparent.

Further to emphasize this correlation another treatment of data embodied in FIG. 4 is shown in FIGS. 5 and 6. It should be noted that the abscissae are plotted directly rather than on a logarithmic scale (as in FIG. 4) to emphasize sections where the ratio has high values.

For the purpose of comparing FIGS. 4, 5 and 6, note that the depth 11,250 feet in well B is identified by reference character "51" in both FIG. 4 and FIG. 6; similarly, the large amplitude excursion at depth 11,175 feet in well B is identified by reference character "52" in both FIG. 4 and FIG. 6. The excursion at depth 10,525 feet in well A is identified by the reference character "53" in FIGS. 4 and 5. In order to find correlation between the character of the two logs, it is necessary to shift one log relative to the other along the depth scales about 520 feet. Note that FIGS. 2–6 all are shown with such displacement.

In contrast, an independent geological study of cores taken during drilling operations indicated, in FIG. 5, the top of smackover "B" (indicated by marker 56) in well A as occurring at about 10,800 feet, while the top of smackover "B" in well B was picked or identified at about 11,270 feet as indicated by marker 57 in FIG. 6. From this geological analysis the formations in well B were thus determined to be about 470 feet lower than in well A. However, the more detailed correlations of character shown in FIGS. 5 and 6 show that the formations occur in well B at about 520 feet deeper than in well A. This indicates an error of about 50 feet in the correlation dependent upon geological data alone. The correlations in FIGS. 5 and 6 are so striking as to require the interpretation shown and indicate the importance of measurements of the concentrations of aluminum and silicon in the formations as to permit the determination of the ratio thereof.

The data illustrated in FIGS. 2–6 were obtained through a detailed laboratory study of earth core samples. This study was formulated in connection with an investigation of the present invention to permit various types of analyses to be performed on the same samples as a means of data control. It should be apparent that having established the facts above set out the invention may be carried out by such laboratory procedures or by simultaneously measuring the radiation from silicon and aluminum with the system shown in FIG. 1. In the latter case amplifiers 24 and 28 respectively pass to a dividing network 60 signals which correspond respectively to the radiation from silicon and aluminum. Thereupon the output appears on channel 61 and applied to recorder 62 represents the ratio of silicon to aluminum. It will be apparent that such a log of the ratio may be obtained automatically as illustrated in FIG. 1 or by measuring amplitudes of logs such as shown in FIGS. 2 and 3 and calculating the ratio of the values thus measured.

Restriction of measured radiation to a specific element is dependent upon time selection and on energy selection as above explained. In any event, a source of high-energy neutron radiation will be preferred in order to produce a first group of altered nuclei in the formations from aluminum atoms and to produce a second group of altered nuclei in the formations from silicon atoms whereby the delayed gamma radiation from the first group and from the second group may be individually registered to denote the intensities thereof as a function of the depth in the well bore.

While the invention has been described in connection with certain specific embodiments thereof, it will now be understood that further modifications will suggest themselves to those skilled in the art and it is intended to cover such modifications as fall within the scope of the appended claims.

What is claimed is:

1. A system for logging a well bore which comprises a source of neutrons of energy at least equal to 2.7 m.e.v. which is substantially free of gamma rays, gamma-ray detector means spaced from said source, means for shielding said detector means from direct neutron radiation from said source, means for moving said detector means along said well bore trailing said source at a speed such that delayed gamma radiation is detected at any given point in said well bore not substantially less than one minute following cessation of bombardment by neutrons at said point, energy discriminating means connected to the detector means for producing a signal proportional to radiation from aluminum 28 produced by neutrons from said source, energy discriminating means connected to said detector means for producing a signal proportional to radiation from sodium 24 produced by neutrons from said source, and means for recording the ratio of the signals from said detector means as a function of depth within said well bore.

2. The system for logging formations penetrated by a well bore which comprises a radiation source for bombarding earth materials of various formation occurring along said well bore with high-energy neutron radiation to produce a first group of altered nuclei from aluminum atoms in material of formations and to produce a second group of altered nuclei from silicon atoms in material of said formations, means including gamma-ray detection means for separately sensing delayed gamma radiation from said first group and from said second group, and means for individually registering the intensities of said delayed gamma radiation as functions of depth of said formations in said well bore.

References Cited in the file of this patent

UNITED STATES PATENTS

| | | |
|---|---|---|
| 2,463,733 | Albaugh | Mar. 8, 1949 |
| 2,508,772 | Pontecorvo | May 23, 1950 |
| 2,648,780 | Herzog | Aug. 11, 1953 |
| 2,665,385 | Herzog | Jan. 5, 1954 |
| 2,752,504 | McKay | June 26, 1956 |
| 2,884,534 | Fearon et al. | Apr. 28, 1959 |
| 2,888,568 | Jones et al. | May 26, 1959 |

FOREIGN PATENTS

| | | |
|---|---|---|
| 724,441 | Great Britain | Feb. 23, 1955 |